Sept. 1, 1964
H. M. TROXELL
3,146,865
CABLE REEL APPARATUS
Filed June 29, 1961
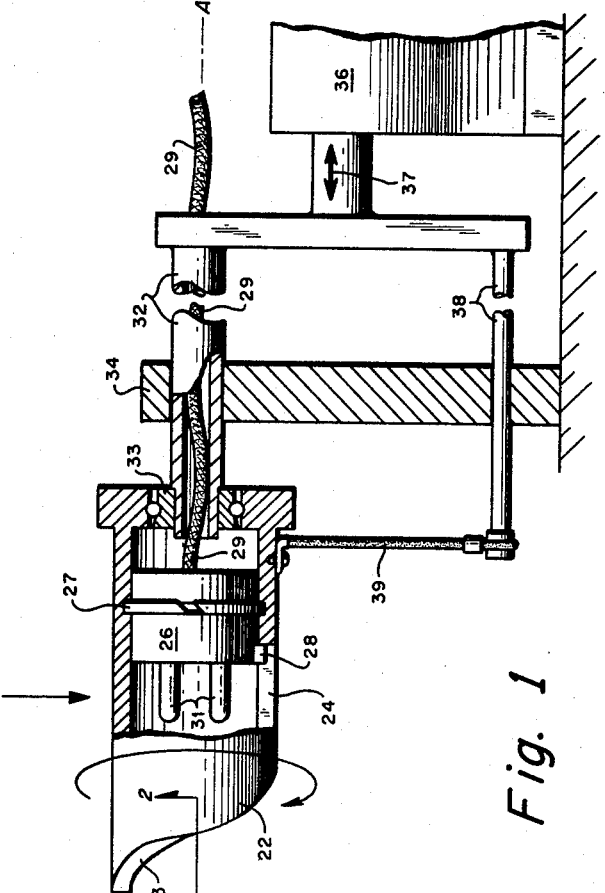
Fig. 2
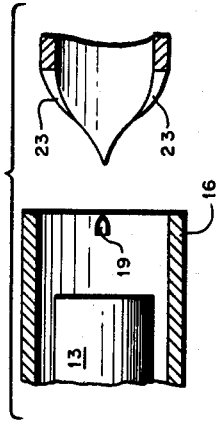
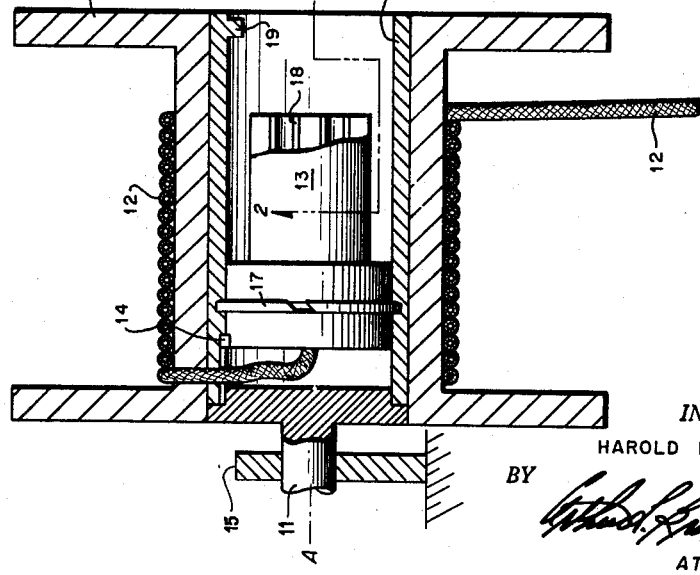
Fig. 1
INVENTOR.
HAROLD M. TROXELL
BY 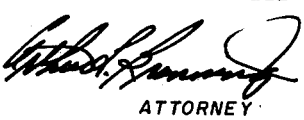
ATTORNEY

United States Patent Office

3,146,865
Patented Sept. 1, 1964

3,146,865
CABLE REEL APPARATUS
Harold M. Troxell, 292 Glenwood Ave.,
Burlington, N.J.
Filed June 29, 1961, Ser. No. 120,796
7 Claims. (Cl. 191—12.4)
(Granted under Title 35, U.S. Code (1952), sec. 266)

The invention described herein may be manufactured and used by or for the Government of the United States of America for governmental purposes without the payment of any royalties thereon or therefor.

The present invention relates to an electric cable reel apparatus and more particularly to a self-indexing electric connecting device which automatically connects and disconnects the rotating end of a reel-wound cable at any angular position where the reel is stopped.

A convenient apparatus for storing electrical cable is a rotating reel from which the cable is extended or retracted an amount in accordance with the desired cable pay-out length desired. Even though a portion of the cable remains wound on the reel, it is often desirable to provide electrical continuity between electrical apparatus at each end of the cable irrespective of the angular position of the reel about its rotation axis. Heretofore, slip-ring type electrical devices were one means used to make the connection at any angular position of the reel. This arrangement requires extremely high contact pressure to assure positive electrical connection under normal vibration and shock load conditions. These pressures produce rubbing which not only shortens the usual life of the slig-ring contacts but adds to maintenance difficulties. In systems where the cable connects between highly sensitive electronic components, slip-ring type devices may substantially degrade the systems to below minimum performance requirements.

Accordingly, it is an object of the present invention to provide apparatus in a rotatable cable reel for connecting one end of an electrical cable at the reel to a stationary electrical connection in which positive mechanical connection is made at any angular position of the reel, in which polarized mating electrical contacts are self-aligned, and with which sensitive electronic circuits can be interconnected without degrading performance.

It is a further object of the present invention to provide an electrical connector for a reel which is unaffected by normal vibration and shock load conditions, which affords long life with minimum maintenance, which is relatively unaffected by dirt and corrosion, and which is subjected to relatively little wear.

It is a still further object of the present invention to provide an improved electrical connector which may be rendered effective or ineffective as desired, and which will be relatively simple, compact, convenient, practical, and inexpensive.

Various other objects and advantages will be apparent from the following description of one embodiment of the invention, and the novel features will be particularly pointed out hereinafter in connection with the appended claims.

In the accompanying drawing:

FIG. 1 represents a cable reel of the present invention, partially in cross section, including structural details of its electrical elements; and FIG. 2 represents a portion of the elements, partially in cross section, taken along the line 2—2 of FIG. 1.

In the illustrated embodiment of the invention, a cable reel 10 is rotatably supported about the axis A—A by a support means 15. Rotation is imparted through a shaft 11 which is drivingly connected to a power means not shown. The reel 10 contains a coaxial cylindrical hollow spool 16 open at one end and press-fitted therein for rotation therewith. An electrical cable 12 having plural conductors is secured at one of its ends to an electrical receptacle 13 which, in turn, is coaxially secured in the spool 16 by the key connection 14 to prevent relative rotation, and by a split-ring 17 to prevent relative axial motion. Each conductor of the cable 12 is connected to separate insulated bushings 18 in the receptacle 13 which are exposed at the open end of the spool 16. A stud 19 fixed adjacent to the open end of the spool 16 projects radially inward from the inner surface of the spool 16 for guiding a plug assembly indicated generally by the numeral 21 now to be described.

The plug assembly 21 comprises a hollow cylindrical member 22 supported coaxially on the axis A–A by a bearing 33 and hollow shaft 32 for rotation about the axis A–A. The shaft 32 is slidable along its axis in a rigid supporting member 34 whereby the plug assembly 21 may be selectively inserted in the spool 16. The end of the member 22 nearest to the spool 16 defines a cam surface 23 which selectively engages against the stud 19, and by camming action causes relative rotation in either direction between the reel 10 and the plug assembly 21 as the member 22 moves into the spool 16. For the fixed position of the reel 10 in the illustrated embodiment, the plug assembly 21 will rotate 180° until the stud 19 reaches a slot 24 in the member 22 running parallel to the axis A–A.

An electrical plug 26 is secured in the member 22 by a split-ring 27 and is fixed against relative rotation by the key connection 28. A cable 29 having a plurality of conductors corresponding to the cable 12 are respectively connected to separate insulated prongs 31 of the plug 26 and connects through the hollow shaft 32 to electrical apparatus not shown. The prongs 31 are arranged with respect to each other so that they will register with the bushings 18 when the receptacle 13 and the plug 26 are urged against each other as the stud 19 slides into the slot 24. The cable 29 must be sufficiently flexible to permit it to twist at least 180° as dictated by the camming action between the stud 19 and cam surface 23.

Motion along the axis A—A of the member 32 is imparted by a reciprocable power actuator 36 as indicated by the arrow 37. A guide rod 38 slidably extending through the member 34 provides a connection for an elastic element 39 between the member 34 and the plug assembly 21. The element 39 urges the plug assembly 21 to its initial position as illustrated.

The operation of the cable reel apparatus will now be summarized. At any predetermined pay-out length of cable 12, it is necessary to make a positive connection between electrical apparatus, not shown, connected at the extended end of the cable 12 and the cable 29. Accordingly, the reel 10 is rotated until the cable 12 reaches the precise pay-out length and is then locked or braked against further rotation. The actuator 36 is then energized to drive the plug assembly 21 into the spool 16. At the point in travel where the cam surface 23 contacts with the stud 19, irrespective of the orientation of the stud 19 relative to the member 22 about the axis A—A, the plug assembly 21 commences to rotate until the stud 19 registers with the slot 24. In this position, the prongs 31 are aligned with the bushings 18 and the electrical receptacle 13 will engage the plug 26 upon further axial motion by the actuator 36. In this manner a positive mechanical and electrical connection in the desired polarity is made between the cables 12 and 29. It will be noted that as the plug assembly 21 rotated, the member 39 elongated within its elastic limit so that the plug assembly 21 will return to the initial position illustrated when it is removed.

From the foregoing, it is thus seen that whatever the desired pay-out length of the cable 12 and the angular position of the reel 10 is, the prong 31 of the plug 26 will always be positioned to align in proper polarity with the contact bushing 18 of the receptacle 13. It will be further noted that rotation of the reel 10 during extension and retraction of the cable 12 has no wearing effect upon the electrical contacts because they are separated until the reel 10 is stopped. It is contemplated that an electric circuit, not shown, may be added by ordinary skill to coordinate operation of the actuator 36 and a reel driving motor so that the electrical connection occurs automatically when the reel 10 is stopped.

It will be understood that various changes in the details, materials, and arrangement of parts which have been herein described and illustrated in order to explain the nature of the invention, may be made by those skilled in the art within the principle and scope of the invention as expressed in the appended claims.

What is claimed is:

1. Cable reel apparatus, comprising, in combination: support means, a reel mounted on said support means having a cylindrically hollow central portion open at one end rotatable about its cylindrical axis in said support means, a first element fixed within the central portion for rotation therewith and having a plurality of polarized electrical contacts exposed toward the open end of said reel, said first element adapted to connect its contacts to one end of an externally wound extendable cable, a stud fixed adjacent to the open end of said reel for rotation therewith and projecting toward the cylindrical axis, a hollow cylindrical member open at one end and having oppositely inclined surfaces on said one end, said surfaces terminating in a knife-like edge projecting from their outermost portion and terminating at their innermost portion at a slot longitudinally extending into said member toward the other end thereof, shaft means mounted on a second support means rotatably and coaxially connected to said member for independent rotation therebetween, said support means slidably supporting said shaft means coaxially so that said surfaces confront said stud, a second element fixed within said member for rotation therewith and having a plurality of electrical contacts exposed at the open end of said member each arranged to matingly engage a discrete polarized contact of said first element, said second element adapted to connect its contacts to one end of a stationary cable, and power means operatively connected for sliding said cylinder into said member; whereby said second element contacts align and engage with said first element contacts when said power means drives said member into said reel.

2. Cable reel apparatus, comprising, in combination: a support means, a reel mounted on said support means having a cylindrically hollow central portion open at one end rotatable about its cylindrical axis in said support means, a first polarized electrical connector fixed within the central portion for rotation therewith and exposed toward the open end of said reel, said first connector adapted to be connected to one end of an externally wound extendable cable, a stud fixed adjacent to the open end of said reel for rotation therewith and projecting toward the cylindrical axis, a hollow cylindrical member open at one end and having oppositely inclined surfaces thereon on said one end, said surfaces terminating in a knife-like edge projecting from their outermost portion and terminating at their innermost portion at a slot longitudinally extending into said member toward the other end thereof, shaft means mounted on a second support means rotatably and coaxially connected to said member for independent rotation therebetween, said support means slidably supporting said shaft means coaxially so that said surfaces confront said stud, a second electrical connector fixed within said member for rotation therewith and exposed at the open end of said member having each contact thereof arranged to matingly engage a discrete polarized contact of said first connector, said second connector adapted to be connected to one end of a stationary cable, and power means operatively connected for sliding said cylinder into said member; whereby said second connector aligns and engages with said first connector when said power means drives said member into said reel.

3. Cable reel apparatus, comprising, in combination: a support means, a rotatable reel mounted on said support means, a first element fixed within the central portion of said reel for rotation therewith and having a plurality of exposed polarized electrical contacts, said first element adapted to be connected at its contacts to one end of an externally wound extendable cable, a projecting stud fixed to said reel for rotation therewith, a rotatable cam member mounted on a second support means, said cam member having oppositely inclined surfaces on said one end terminating in a knife-like edge projecting from their outermost portion and terminating at their innermost portion at a slot longitudinally extending into said member toward the other end thereof, a second element fixed within said cam member for rotation therewith and having a plurality of exposed electrical contacts each arranged to matingly engage a discrete contact of said first element, said second element adapted to be connected at its contacts to one end of a stationary cable, and drive means operatively connected to and for engaging said cam member and said reel; whereby said second element contacts align and engage with said first element contacts when said drive means operates.

4. Cable reel apparatus, comprising, in combination: a support means, a rotatable reel mounted on said support means, a first polarized electrical connector fixed within the central portion of the reel for rotation therewith and exposed toward the open end of said reel, said first connector adapted to be connected to one end of a wound extendable cable, a stud fixed to said reel for rotation therewith, a rotatable member mounted on a second support means, said member having oppositely inclined surfaces on one end terminating in a knife-like edge projecting from their outermost portion and terminating at their innermost portion at a slot longitudinally extending into said member toward the other end thereof, a second connector fixed within said rotatable member for rotation therewith and arranged to matingly engage discrete contacts of said first connector, said second connector adapted to be connected to one end of a stationary cable, and drive means operatively connected to and for engaging said cam member and said reel; whereby said second connector aligns and engages with said first connector when said drive means operates.

5. A polarized electrical connector apparatus, comprising: a support means, a first hollow cylindrical member open at one end rotatably mounted on said support means, a first element fixed within said first member for rotation therewith and having a plurality of polarized electrical contacts exposed toward the open end of said member, each of said contacts of said first element formed to be connected to an external electrical circuit, a stud fixed adjacent to the open end of said first member for rotation therewith and projecting toward the cylindrical axis of said first member, a second hollow cylindrical member open at one end and having oppositely inclined surfaces on said one end, said surfaces terminating in a knife-like edge projecting from their outermost portion and terminating at their innermost portion at a slot longitudinally extending into said second member toward the other end thereof, shaft means rotatably and slidably mounted on a second support means and coaxially connected to said second member for independent rotation therebetween, said support means maintaining said shaft means axially aligned with the cylindrical axis of said first member so that said surfaces confront said stud, a second element fixed within said second member for rotation therewith having a plurality of electrical contacts exposed at the open end of said second member each arranged to matingly engage a discrete polarized contact of said first element, each contact of said second element formed to be connected to another external circuit, and force-exerting means whereby said second element contacts align and engage with said first element contacts as a force is applied to axially slide said second member toward said first member.

6. A polarized electrical connector apparatus, comprising: a support means, a first element mounted on said support means for rotation relative thereto and having a plurality of exposed polarized electrical contacts, a projecting stud fixed to said element for rotation therewith, a rotatable cylindrical cam member mounted on said support means having oppositely inclined surfaces at one end thereof terminating in a knife-like edge projecting from their outermost portion and terminating at their innermost portion at a slot longitudinally extending into said cam toward the other end thereof, said stud being positioned to enter said slot, a second element fixed within said cam member for rotation therewith and having a plurality of exposed electrical contacts each arranged to matingly engage a discrete contact of said first element, and force-exerting means whereby said second element contacts electrically align and engage with said first element contacts as a force is applied to axially slide said second member toward said first member.

7. A polarized electrical connector apparatus, comprising: a support means, a first polarized electrical connector mounted on said support means for rotation relative thereto and exposed at one end thereof, a stud fixed to said first connector for rotation therewith, a rotatable member mounted on a second support means having oppositely inclined surfaces thereon terminating in a knife-like edge projecting from their outermost portion and terminating at their innermost portion at a slot longitudinally extending into said member, said stud being positioned to enter said slot, a second connector fixed within said member for rotation therewith and arranged to matingly engage discrete contacts of said first connector, and force-exerting means whereby said second connector electrically aligns and engages with said first connector as a force is applied to axially slide said second member toward said first member.

References Cited in the file of this patent
UNITED STATES PATENTS

| | | |
|---|---|---|
| 1,736,269 | Lawrence | Nov. 19, 1929 |
| 1,812,343 | Johnson et al. | June 30, 1931 |
| 1,861,223 | Muellerweiss | May 31, 1932 |
| 2,016,441 | Kelley | Oct. 8, 1935 |
| 2,825,924 | Humphrey | Mar. 11, 1958 |

FOREIGN PATENTS

| | | |
|---|---|---|
| 326,484 | Great Britain | Mar. 13, 1930 |
| 555,124 | Italy | Jan. 18, 1957 |